Patented Oct. 3, 1922.

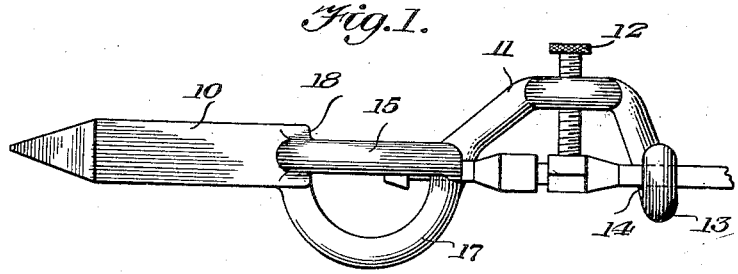
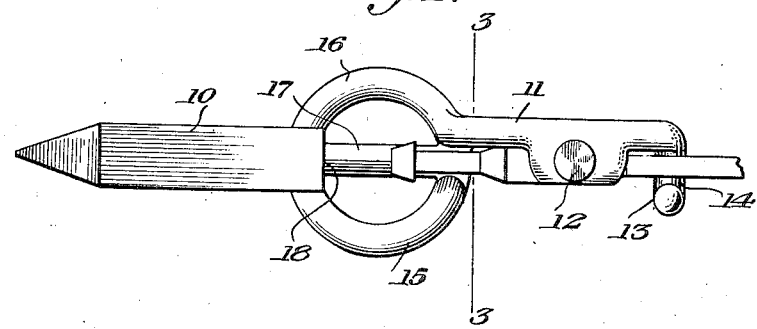
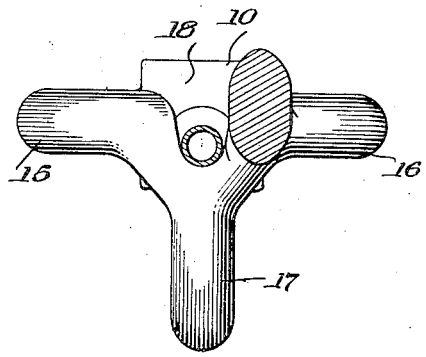

1,430,958

UNITED STATES PATENT OFFICE.

NEWEL BIXBY DORMAN, OF AMES, IOWA.

SOLDERING IRON.

Application filed June 21, 1921. Serial No. 479,261.

*To all whom it may concern:*

Be it known that I, NEWEL BIXBY DORMAN, a citizen of the United States, residing at Ames, in the county of Story and State of Iowa, have invented new and useful Improvements in Soldering Irons, of which the following is a specification.

This invention comprehends the provision of a soldering iron designed to permit it to be quickly attached or detached from an acetylene blow torch, the invention embodying amongst other features a plurality of heat conducting ribs arranged between the points of the iron, and the clamp therefor, the relative disposition of the ribs being such as to prevent the flame of the torch from coming in contact with a work bench or the like when the torch and iron as a unit is laid upon the bench.

The nature and advantages of the invention will be better understood when the following detailed description is read in connection with the accompanying drawing, the invention residing in the combination, construction, and arrangement of parts as claimed.

In the drawing forming part of this application, like numerals of reference indicate similar parts in the several views and wherein:

Figure 1 is a side elevation of the soldering iron constructed in accordance with the invention.

Figure 2 is a top plan view.

Figure 3 is a sectional view taken on line 3—3 of Figure 2.

Referring to the drawing in detail, 10 indicates the iron, which is formed to provide an angular-shaped flange 11 by means of which the iron may be associated with an acetylene blow torch, thereby permitting the use of the iron and torch as a unit. The torch is held associated with the clamp 11 by means of a set screw 12, the torch being arranged in axial alinement to the iron 10. The angular portion 13 of the clamp 11 is provided with an opening 14 to receive the torch.

Forming an integral part of the iron and interposed between the latter and the bracket 11 is a plurality of ribs, indicated at 15, 16 and 17 respectively. The ribs 15 and 16 lie in the same horizontal plane and unitedly define an annulus, while the rib 17 is of arcuate formation and terminally connected with the ribs 15 and 16 at diametrically opposite points of the annulus above referred to. The ribs at the point of juncture adjacent the bracket 11 is provided with an opening to receive a portion of the torch so that the flame is directed against the shoulder 18 formed at the one end of the iron 10. The ribs above mentioned become heated from the flame of the torch, and are utilized to conduct heat to the iron 10. It will be further observed that by reason of the relative disposition of the ribs, that the torch and iron can be laid upon a bench or the like without any possibility of the flame from the torch coming in contact with the bench. As the flame from the torch is adjustable, it can be regulated to heat the iron in quick order and then subsequently adjusted so that it will afford a constant temperature at the point of the iron 10.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:

1. A soldering iron comprising a body portion, an angular-shaped bracket designed to associate the iron with an acetylene blow torch, and means for connecting the bracket and torch, whereby the torch is arranged in axial alinement with said iron, heat conducting ribs interposed between the body of the iron and said bracket, and said ribs being angularly disposed relatively for the purpose specified.

2. A soldering iron comprising a body portion, an angular-shaped bracket, heat conducting ribs joining the body of the iron and said bracket, two of said ribs being arranged in the same plane and together defining an annulus, and the remaining rib being of arcuate formation and terminally connected with the annulus at spaced points in alinement with the iron and said bracket.

In testimony whereof I affix my signature.

NEWEL BIXBY DORMAN.